United States Patent
Cheon (10) Patent No.: US 11,652,759 B1
(45) Date of Patent: May 16, 2023

(54) METHODS AND APPARATUS FOR PREAMBLE DETECTION IN A COMMUNICATION NETWORK

(71) Applicant: Marvell Asia Pte, Ltd., Singapore (SG)

(72) Inventor: Hyun Soo Cheon, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 56 days.

(21) Appl. No.: 17/233,405

(22) Filed: Apr. 16, 2021

Related U.S. Application Data (60) Provisional application No. 63/011,196, filed on Apr. 16, 2020.

(51) Int. Cl.
  *H04L 49/90* (2022.01)
  *H04W 48/08* (2009.01)
  *G06F 16/23* (2019.01)
  *H04L 27/00* (2006.01)

(52) U.S. Cl.
  CPC .......... *H04L 49/90* (2013.01); *G06F 16/2379* (2019.01); *H04L 27/0014* (2013.01); *H04W 48/08* (2013.01); *H04L 2027/0095* (2013.01)

(58) Field of Classification Search
  CPC .......... H04L 49/90; H04L 27/0014; H04L 2027/0095; G06F 16/2379; H04W 48/08
  See application file for complete search history.

(56) References Cited

U.S. PATENT DOCUMENTS

| | | | | |
|---|---|---|---|---|
| 2005/0063493 A1* | 3/2005 | Foster | ............... | H04L 27/227 375/329 |
| 2010/0075611 A1* | 3/2010 | Budampati | ......... | H04L 27/0014 455/67.11 |
| 2014/0241178 A1* | 8/2014 | Seely | ............... | H04W 24/04 370/252 |
| 2014/0242922 A1* | 8/2014 | Seely | ............ | H04L 27/0014 455/73 |
| 2014/0242936 A1* | 8/2014 | Seely | ............... | H04L 27/10 455/307 |
| 2016/0337891 A1* | 11/2016 | Seely | ............... | H04W 24/08 |

OTHER PUBLICATIONS

"Detection of Preamble of Random Access Burst in W-CDMA System"; Zakharov et al.; 11th IEEE International Symposium on Personal Indoor and Mobile Radio Communications. PIMRC 2000. Proceedings (Cat. No. 00TH8525) (Year: 2000).*

* cited by examiner

*Primary Examiner* — Benjamin H Elliott, IV
(74) *Attorney, Agent, or Firm* — JW Law Group; James M. Wu (57) ABSTRACT

Methods and apparatus for preamble detection in a communication network are disclosed. In an exemplary embodiment, a method includes retrieving parameters from a parameter database, filling a buffer of preamble data received in an uplink transmission from user equipment, and frequency shifting the buffer of preamble data based on one or more first parameters to generate frequency shifted data. The method also includes oversampling the frequency shifted data to generates oversampled data, downsampling the over sampled data based on one or more second parameters to generate preamble samples, and updating the parameter database with updated values for the one or more first and second parameters. The method also includes repeating all the operations until a selected amount of preamble samples is obtained.

20 Claims, 6 Drawing Sheets

METHODS AND APPARATUS FOR PREAMBLE DETECTION IN A COMMUNICATION NETWORK

CROSS-REFERENCE TO RELATED APPLICATIONS

This application claims the benefit under 35 U.S.C. § 119 of U.S. Provisional Patent Application No. 63/011,196 filed on Apr. 16, 2020 and entitled "RATE CONVERTER FOR PREAMBLE DETECTION IN 4G/5G BASESTATION SYSTEM-ON-A-CHIP (SoC)," which is incorporated by reference herein in its entirety.

FIELD

The exemplary embodiments of the present invention relate to communication networks. More specifically, the exemplary embodiments of the present invention relate to receiving and processing data streams via a wireless communication network.

BACKGROUND

High speed communication networks, such as fourth generation (4G) long term evolution (LTE) and fifth generation (5G) new radio (NR) networks are becoming increasingly utilized to communicate data between user equipment. To communicate over these networks, a user equipment first needs to acquire access privileges. In 4G LTE/5G NR systems, multiple format access preambles can be transmitted in uplink transmissions from user equipment to obtain access privileges from the network. Each access preamble format has its own sample rate and bandwidth. Typically, a base station receiver needs many instances of a preamble detector, which are simultaneously running at each carrier frequency to detect the received preambles.

Therefore, it is desirable to have a system to perform preamble detection in a fast and efficient manner.

SUMMARY

In various exemplary embodiments, methods and apparatus for preamble detection are disclosed.

In an exemplary embodiment, a method is provided that comprises retrieving parameters from a parameter database, filling a buffer of preamble data received in an uplink transmission from user equipment, and frequency shifting the buffer of preamble data based on one or more first parameters to generate frequency shifted data. The method also includes oversampling the frequency shifted data to generates oversampled data, downsampling the over sampled data based on one or more second parameters to generate preamble samples, and updating the parameter database with updated values for the one or more first and second parameters. The method also includes repeating all the operations until a selected amount of preamble samples is obtained.

In an exemplary embodiment, apparatus is provided that comprises a processor and a memory configured to perform operations of: retrieving parameters from a parameter database stored in the memory; filling a buffer of preamble data received in an uplink transmission from user equipment; and frequency shifting the buffer of preamble data based on one or more first parameters to generate frequency shifted data. The processor and the memory are also configured to perform operations of: oversampling the frequency shifted data to generate oversampled data; downsampling the oversampled data based on one or more second parameters to generate preamble samples; updating the parameter database with updated values for the one or more first and second parameters; and repeating all the operations until a selected amount of preamble samples is obtained.

Additional features and benefits of the exemplary embodiments of the present invention will become apparent from the detailed description, figures and claims set forth below.

BRIEF DESCRIPTION OF THE DRAWINGS

The exemplary aspect(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In various exemplary embodiments, methods and apparatus for preamble detection in a communication network are disclosed.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It is understood that in the development of any such actual implementation, numerous implementation-specific decisions may be made in order to achieve the developer's specific goals, such as compliance with application and business-related constraints, and that these specific goals will vary from one implementation to another and from one developer to another. Moreover, it will be understood that such a development effort might be complex and time consuming, but would nevertheless be a routine undertaking of engineering for those of ordinary skills in the art having the benefit of the embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

Figure 1:
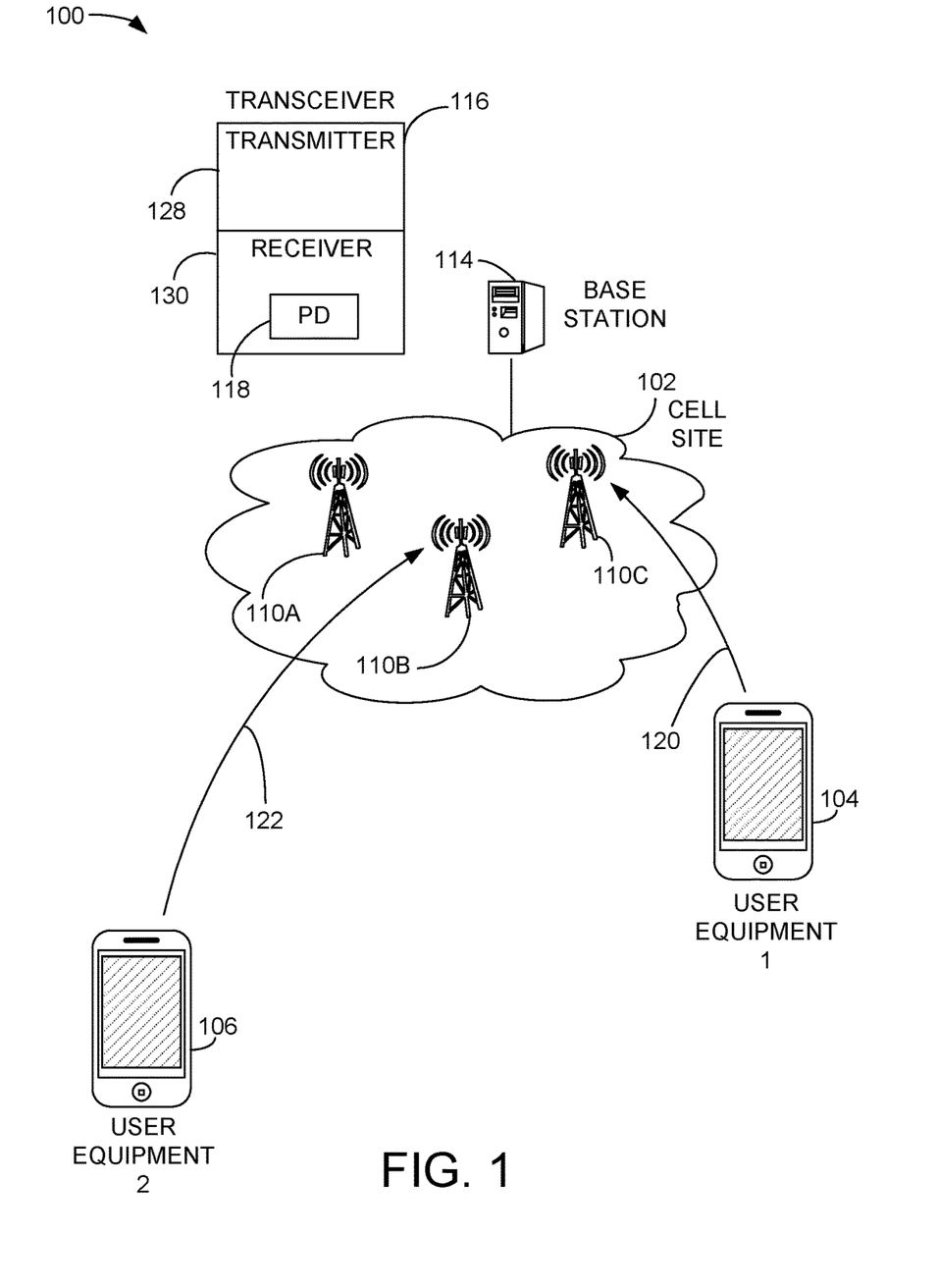
FIG. 1 shows a communication network comprising a transceiver having an exemplary embodiment of a preamble detector configured for accurate detection of preambles associated with received uplink communications.

FIG. 1 shows a communication network 100 comprising a transceiver 116 having an exemplary embodiment of a preamble detector (PD) 118 configured for fast and accurate detection of preambles associated with received uplink communications. The communication network 100 includes a base station 114 that includes the transceiver 116. The transceiver 116 has a transmitter portion 128 and a receiver portion 130. The base station 114 is configured to communicate with radio towers 110A-C located in cell site 102. In various embodiments, the communication network 100 comprises a 4G LTE or 5G NR communication network. Aspects of the invention are also suitable for use with other types of communication networks.

User equipment 1 (UE1) 104 transmits uplink communications 120 to the base station 114 through tower 110c, and user equipment 2 (UE2) 106 transmits uplink communications 122 to the base station 114 through tower 110b. For example, the UEs can be smartphones, handheld devices, tablet computers or iPad® devices or any other suitable communication device. It should be noted that the underlying concepts of the exemplary embodiments of the present invention would not change if one or more blocks (or devices) were added or removed from the communication network 100.

Each user equipment transmits an access preamble to acquire access privileges to the network. In 4G LTE/5G NR systems, multiple format access preambles are utilized and each format has its own sample rate/bandwidth. To improve the efficient processing of access requests from UEs, the receiver 130 includes the preamble detector 118. The preamble detector 118 operates to detect the preamble transmitted in an uplink from each UE. A more detailed description of the PD 118 is provided below.

Figure 2:
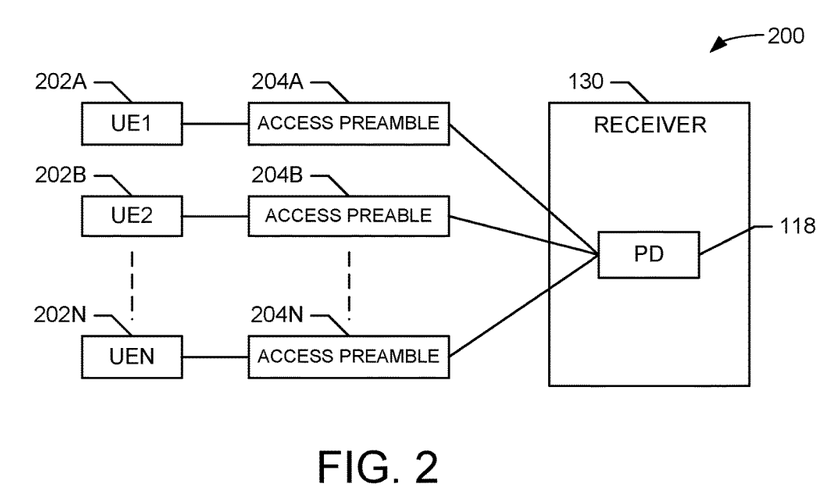
FIG. 2 shows an exemplary functional block diagram of the communication network shown in FIG. 1.

FIG. 2 shows an exemplary functional block diagram 200 of the communication network 100 shown in FIG. 1. Each user equipment 202A-N transmits signals to the receiver 130 through an uplink transmission. To access the network, each user transmits an access preamble 204A-N. In various exemplary embodiment, the preamble detector 118 operates to provide efficient detection the access preamble received from each UE.

Figure 3:
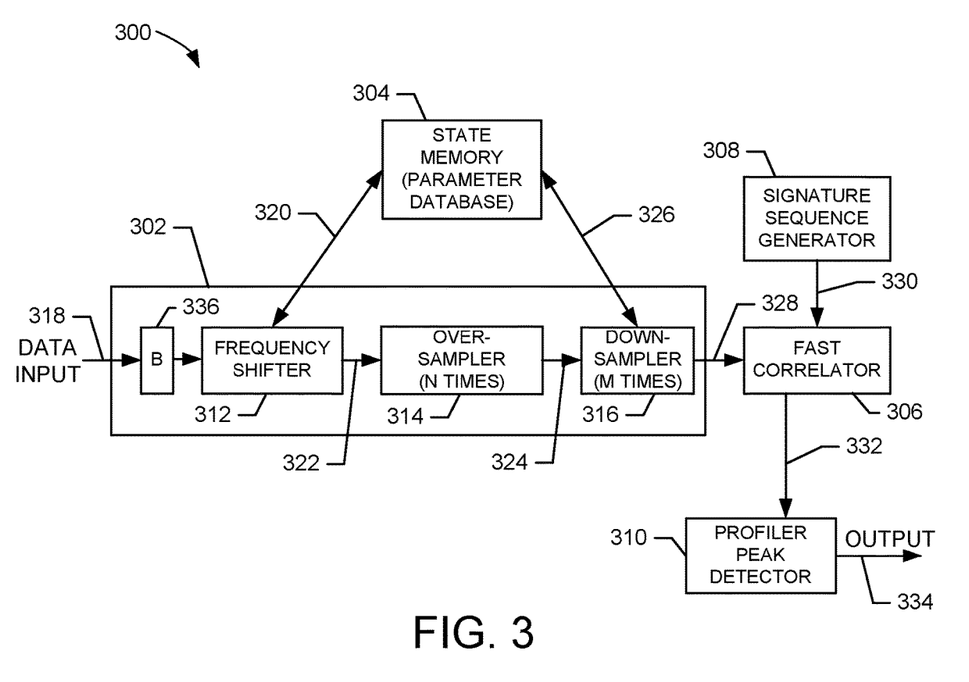
FIG. 3 shows an exemplary embodiment of a preamble detector.

FIG. 3 shows an exemplary embodiment of a preamble detector 300. The preamble detector 300 is suitable for use as the preamble detector 118 shown in FIG. 1. In an embodiment, the preamble detector 300 comprises detector 302, state memory 304, fast correlator 306, signature sequence generator 308, and peak detector 310. The detector 302 comprises frequency shifter 312, oversampler 314, downsampler 316, and buffer 336.

During operation, the preamble detector 300 processes a selectable amount of received signal samples from one or more UE. In this process, state parameters are stored in the state memory 304 and are used by the frequency shifter 312 and the downsampler 314. In an embodiment, state parameters are defined for each virtual receiver set. The detector 302 retrieves the state parameters from the state memory 304 when a preamble detection job starts/resumes, and stores updated state parameters in the state memory 304 after each iteration of the preamble detection job until the job is completed.

In an embodiment, received uplink preamble signals flow through a signal chain comprising the buffer 336, frequency shifter 312, oversampler 314, and downsampler 316. In order to minimize memory usage, the frequency shifter 312 and downsampler 316 operate on a small number of input samples stored in the buffer 336. In doing so, the number of output samples is smaller than the number of input samples in most cases, and therefore the same hardware can be reused multiple times for other virtual receivers. For example, if the detector is implemented on a system-on-chip (SoC) device, there is limited space for memory, which occupies more space than other processing logic. Furthermore, the cost of RAM is related to its size. However, if the SoC has to store the entire received signal for a certain process, it needs a larger memory to do this. In order to avoid requiring a large memory, the received signal samples are converted as frequently as possible to minimize the buffer usage. In this implementation, the received signal should be decimated (e.g., converted to smaller number of samples than the input samples in most cases), so that this process is performed as frequently as possible. The implementation for doing this process uses piecewise filtering and decimation as described herein. Therefore, to avoid using a large buffer as in conventional systems, multiple smaller buffers are used for the filter/decimation process, and a mechanism is provided for stopping and resuming the filter/decimation process whenever it is needed.

As an example of the reduction in buffer size achieved by embodiments of the preamble detector disclosed herein, it will be assumed that a PRACH long preamble with 839 samples is interpolated to 24576 samples per preamble (e.g., for 20 MHz LTE/NR bandwidth) and transmitted to the receiver. On the receiver side, if using the conventional approach, the receiver would need to buffer the 24576 samples and then decimate this amount to 2048 samples using a FIR-filter and decimator. However, using embodiments of the preamble detector disclosed herein, just 2048 samples are buffered and running the filtering and decimation reduces this to just 170 samples for each iteration to process a full buffer.

Received uplink data samples 318 are stored in the buffer 336 and then input to the frequency shifter 312 of the detector 302. In an embodiment, the received data samples 318 are received in a small buffer 336 so that the buffer may be re-loaded multiple times to receive the preamble data. Thus, the detector 300 is configured to process smaller-sized sample blocks multiple times instead of long sample blocks. The frequency shifter operates to shift the frequency of the received data in order to select the preamble signal at the desired frequency to generate frequency shifted data 322. In an embodiment, the frequency shifter 312 utilizes parameters 322 to perform the frequency shift. For example, the parameters include an accumulated phase value that allows the frequency shifter 312 to operate over multiple buffers of input data. A more detailed description of an embodiment of a frequency shifter is provided with reference to FIG. 4.

The frequency shifted data 322 is input to the oversampler 314 that oversamples the data "N" times to generate oversampled data 324. The downsampler 316 receives the oversampled data 324 and downsamples the received data "M" times to generate downsampled data 328.

In an embodiment, the downsampler 316 comprises a multistage cascade integrator comb (CIC) downsampler. The downsampler utilizes selected parameters 326 from the parameters database 304 to perform the downsampler operation. For example, the parameters include an input sample count and filter states represented by accumulator values in the CIC filter for all stages. A more detailed description of an embodiment of a downsampler is provided with reference to FIG. 5. Once the frequency shifting and the downsampling are complete for the current buffer of received data, updated values for the parameters are stored back into the parameter database 304.

In an embodiment, the detector 302 operates on one or more buffers of received input data 318 to generate enough samples 328 for preamble detection. Once enough output samples from the downsampler are generated, the output samples are input to the fast correlator 306. The correlator 306 performs a correlation between the output 328 of the downsampler 316 and a signature sequence 330 output from the signature sequence generator 308. Correlation can begin whenever there is a sufficient amount of output samples passed from the downsampler 316. In an embodiment, the time interval between the inputs received from the downsampler 316 enables almost full utilization of the fast correlator 306. The peak detector 310 receives the correlated output 332 and performs a peak detection to detect the received preamble and generate a preamble output 334

Accordingly, the various embodiments of the preamble detector 300 operate to buffer small amounts of received uplink preamble data and then perform preamble detection over multiple amounts of buffered data. Thus, the detector 300 has low memory requirements as the input buffer is small. The detector 300 also provides almost full utilization of the hardware, and is able to realize almost ideal data throughput with minimum complexity. In contrast, conventional receivers process long sample blocks and utilize multi-stage FIR filters that cannot be stopped in the middle of the processing job. It is also difficult for conventional systems to reuse the same hardware for multiple detections, since conventional systems have to wait for the previous job to complete before starting a new one.

Figure 4:
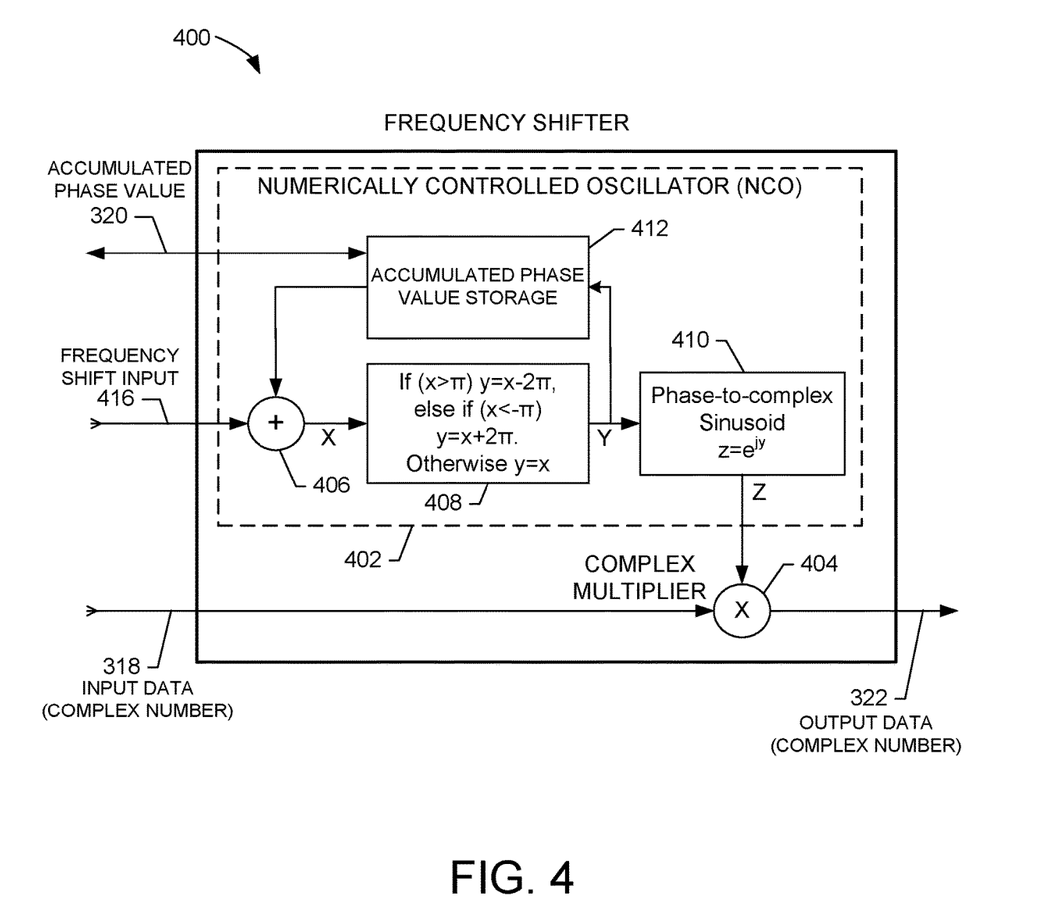
FIG. 4 shows an exemplary embodiment of a frequency shifter for use in the preamble detector shown in FIG. 3.

FIG. 4 shows an exemplary embodiment of a frequency shifter 400 for use in the preamble detector shown in FIG. 3. For example, the frequency shifter 400 is suitable for use as the frequency shifter 312 shown in FIG. 3. In an embodiment, the frequency shifter 400 comprises a numerically controlled oscillator (NCO) 402 and a complex multiplier 404. The NCO 402 comprises an adder 406, phase computation circuit 408, phase conversion circuit 410, and accumulated phase value storage 412.

During operation, the frequency shifter 400 receives complex input data, such as input data 318 that is received from the buffer 336. The input data 318 is input to the complex multiplier 404. An accumulated phase value, such as accumulated phase value 320 is loaded in the storage 412. The stored accumulated phase value is input to the adder 406. The adder 406 also receives a frequency shift input 416 that indicates an amount of frequency shift to be applied. In an embodiment, the frequency shift input 416 is generated by an external controller, such as the processor 602 shown in FIG. 6.

The adder 406 adds the values at its inputs to generate a value X at it output that is then input to the phase computation circuit 408. The circuit 408 determines a phase value Y based on the received X input. In an embodiment, when $(X>\pi)$, then $(Y=X-2\pi)$, when $(X<-\pi)$, then $(Y=X+2\pi)$, and when $(\pi>X>-\pi)$, then $(Y=X)$.

The computed value Y is input to the phase conversion circuit 410 that generates a complex sinusoid Z based on the received Y input. In an embodiment, the value of Z is determined from $(Z=e^{jY})$. The value of Z is input to the complex multiplier 404. The complex multiplier 404 multiples its inputs to generate a frequency shifted output, such as frequency shifted output 322 shown in FIG. 3. The computed Y value, which represents the accumulated phase, is stored in the storage 412. Once the buffer of input data 318 has been phase shifted, the accumulated phase value 320 in the storage 412. When resuming/stopping a detection job, the accumulated phase value in storage 412 is read from or written to the parameter database 304.

Figure 5:
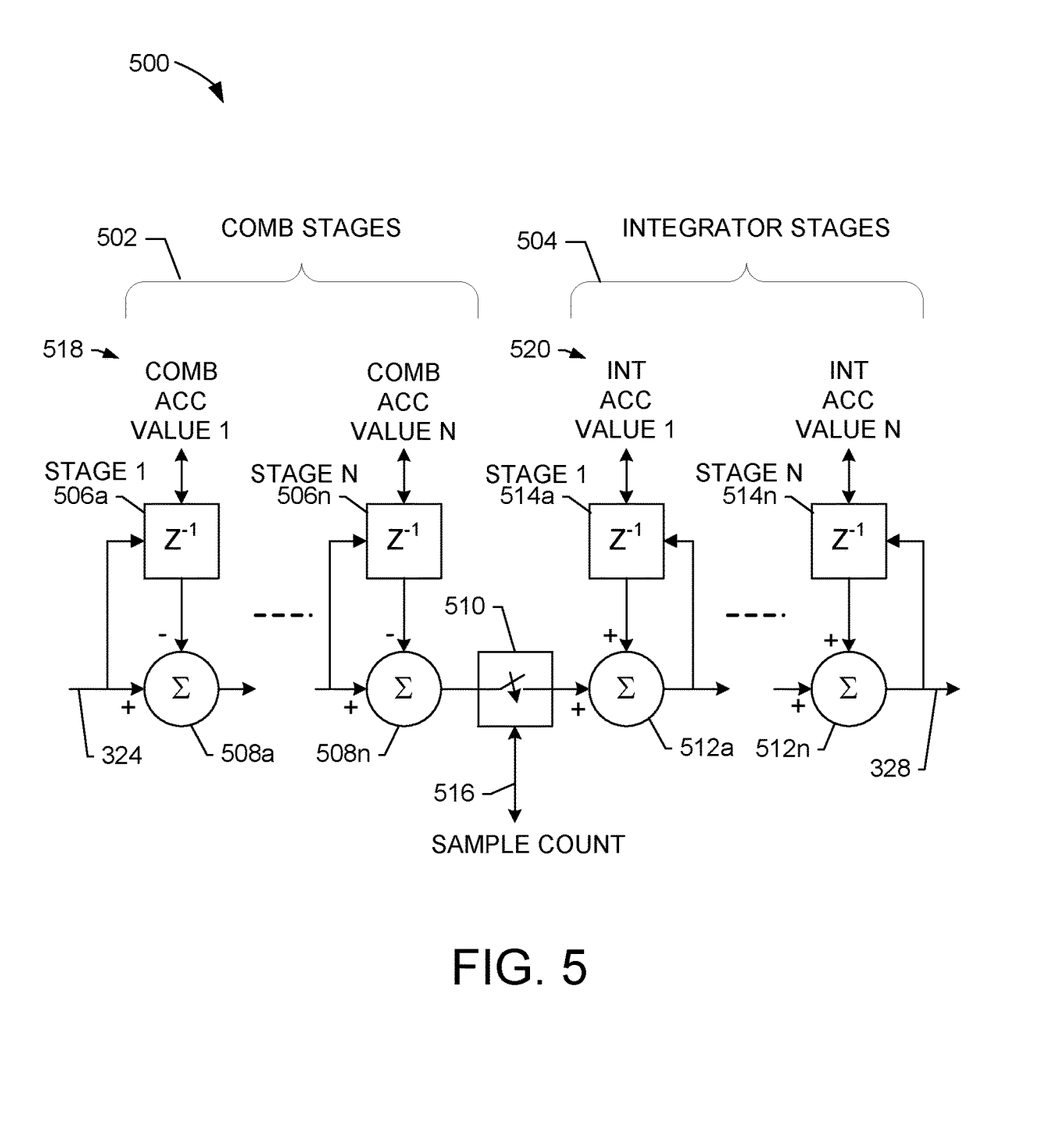
FIG. 5 shows an exemplary embodiment of a cascaded integrator-comb filter for use in the preamble detector shown in FIG. 3.

FIG. 5 shows an exemplary embodiment of a cascaded integrator-comb (CIC) downsampler 500 for use in the preamble detector shown in FIG. 3. For example, the downsampler 500 is suitable for use as the downsampler 316 shown in FIG. 3. In an embodiment, the downsampler 500 comprises comb stages 502 and integrator stages 504. The comb stages 502 comprise a plurality of $(Z^{-1})$ stages 506a-n connected to a plurality of summation circuits 508a-n. The integrator stages 504 comprise a plurality of $(Z^{-1})$ stages 514a-n connected to a plurality of summation circuits 512a-n. A controllable switch 510 connects the output of the comb stages 502 to the input of the integrator stages 504 based on a sample count value 516.

During operation, comb accumulator values (1-n) 518 are loaded into the $Z^{-1}$ stages 506a-n, and integrator accumulator values (1-n) 520 are loaded in the $Z^{-1}$ stages 514a-n. In an embodiment, the accumulator value 518 and 520 are loaded from parameter database 304 as indicated at 326.

Data input 324 is input to the first Z–1 stage 506a and the first summation stage 508a. In an embodiment, the data input 324 is received from the oversampler 314 shown in FIG. 3. The output of each summation stage 508 is input to a subsequent stage until the final summation stage 508n provides its output to the switch 510. The sample count 516 is received from the parameter database and controls the switch 510 to pass the output of the comb stages 502 to the input of the integrator stages 504. For example, the first summation stage 512a of the integrator stage 504 receives the output of the comb stages 502 from the switch 510. The output of each summation stage 512 is input to a subsequent stage until the final summation stage 512n provides the downsampled output 328. When resuming/stopping a detection job, the comb accumulator values 518 and the integrator accumulator values 520 are read from or written to the parameter database 304.

Figure 6:
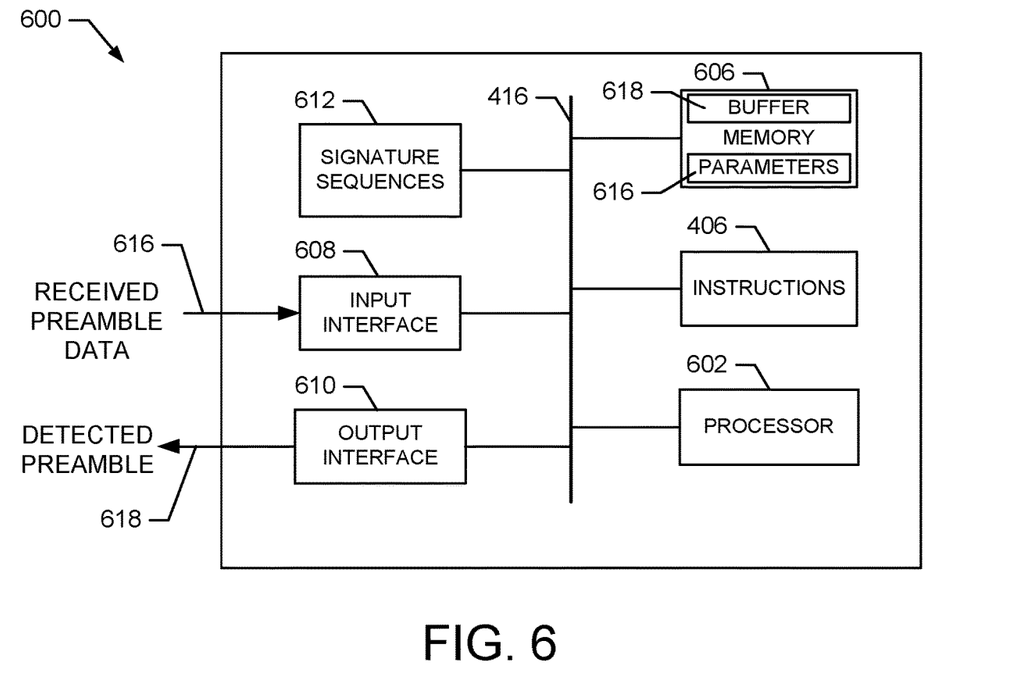
FIG. 6 shows an alternative exemplary embodiment of a preamble detector.

FIG. 6 shows an alternative exemplary embodiment of a preamble detector 600. For example, the preamble detector 600 is suitable for use as the preamble detector 118 shown in FIG. 1. In an embodiment, the preamble detector 600 comprises processor 602, instructions 606, memory 606, input interface 608, output interface 610, and signature sequences 612, all coupled to communicate over bus 616. In an embodiment, the memory comprises parameter database 616 and an input data buffer 618.

In an embodiment, preamble data 616 received in uplink transmissions from user equipment is input to the input interface 608. The input interface 608 buffers the received preamble data for processing by the processor 602.

In an embodiment, the processor 602 executes the instructions 606 to perform the preamble detection functions described herein. For example, the processor 602 performs at least the following operations.

1. Buffer received preamble input data 616 in the buffer 618 until the buffer 618 is full.

2. Frequency shift the buffer 618 of preamble input data based on parameters 616 stored in the memory 606 to generate frequency shifted data. For example, the processor 602 performs the functions of the frequency shifter 400 shown in FIG. 4. In an embodiment, the processor 602 obtains an accumulated phase value (e.g., 320) from the parameters 616 and performs the described frequency shifting operations to generate frequency shifted data.

3. Oversample the frequency shifted data to generate oversampled data. In an embodiment, the processor 602 performs the functions of the oversampler 314 shown in FIG. 3.

4. Downsample the oversampled data based on parameters 616 stored in the memory 606 to generate preamble samples. For example, the processor 602 performs the functions of the downsampler 500 shown in FIG. 5. In an embodiment, the processor 602 obtains the comb states accumulated values 518, integrator accumulated values 520, and the sample count value 516 from the parameters 616 and performs the described downsampling operations to generate the downsampled data (e.g., preamble samples).

5. Update the parameters 616 in the memory 606. In an embodiment, the updated parameters for the frequency shifting and downsampling are stored in the parameters database 616 in the memory 606.

6. Determine if there are enough preamble samples. For example, a selected number of preamble samples is used as input to a fast correlation process (e.g., fast correlator 306). If there are not enough preamble samples, then return to operation (1) to buffer more preamble input data and perform another iteration. If there are enough preamble samples, then proceed to operation (7).

7. Correlate the preamble samples with signature sequences 612 to generate correlated data. In an embodiment, the processor 602 correlates the output of the downsampling process (preamble samples) with the signature sequences 612.

8. Peak detect the correlated data to detect a received preamble. In an embodiment, the processor 602 performs a peak detection process on correlation output to identify a selected preamble sequence in the received data.

9. Output the detected preamble 618 from output interface 610.

Thus, the preamble detector 600 operates to receive preamble data in uplink transmissions and detect preambles transmitted from user equipment.

Figure 7:
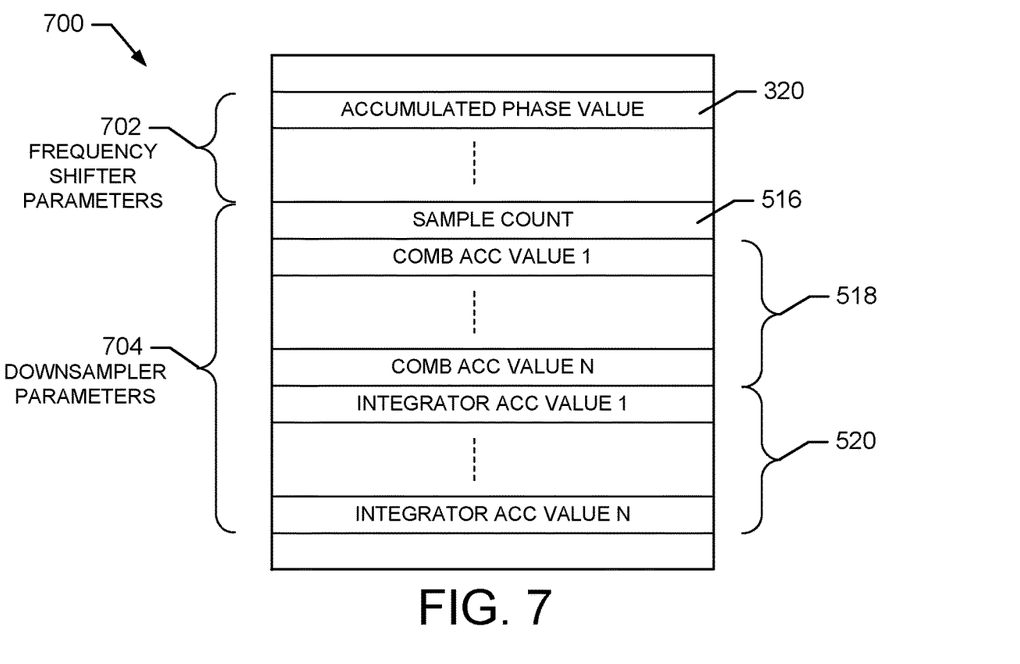
FIG. 7 shows an exemplary embodiment of a parameter database for use with embodiments of a preamble detector.

FIG. 7 shows an exemplary embodiment of a parameter database 700 for use with embodiments of a preamble detector. In an embodiment, the database 700 is suitable for use as the database 304 shown in FIG. 3, or the database 616 shown in FIG. 6. In an embodiment, the database 700 comprises frequency shifter parameters 702, which include the accumulated phase values 320. The database 700 also comprises downsampler parameters 704, which include the sample count 516, comb accumulator values 518, and the integrator accumulator values 520. It should be noted that the database 700 is exemplary and that other implementations are within the scope of the embodiments.

Figure 8:
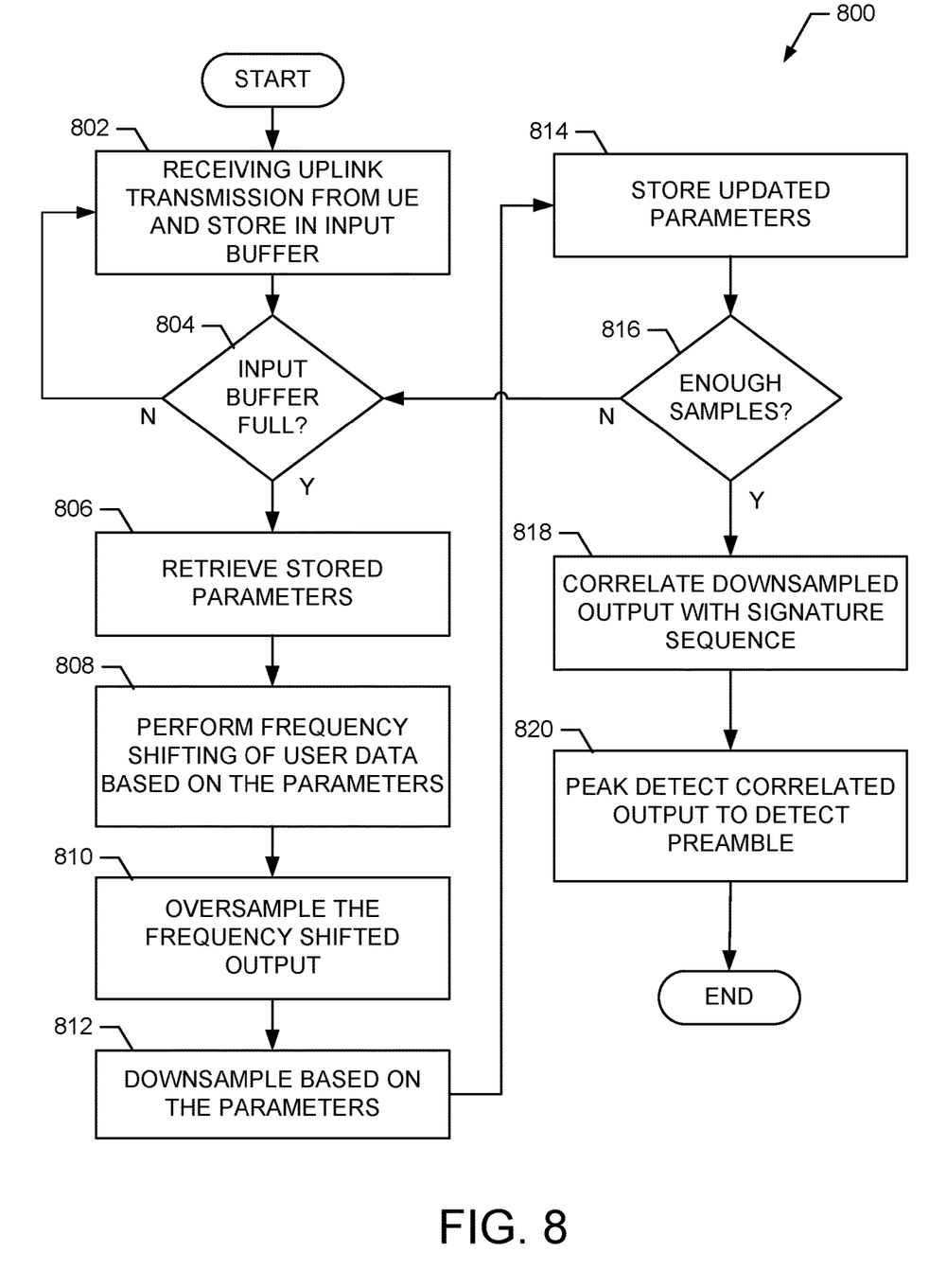
FIG. 8 shows a method for detecting a preamble in a received uplink transmission in accordance with embodiments of the present invention.

FIG. 8 shows a method 800 for detecting a preamble in a received uplink transmission in accordance with one embodiment of the present invention. For example, in an exemplary embodiment, the method 800 is performed by the PD 118 shown in FIG. 1, the PD 300 shown in FIG. 3, or the PD 600 shown in FIG. 6.

At block 802, uplink transmissions are received at a receiver from one or more user equipment. For example, the uplink transmissions include preamble data that are used to obtain network services for each UE. The uplink transmission data is stored in an input buffer.

At block 804, a determination is made as to whether an input buffer is full. For example, the input interface 608 receives uplink preamble data and stores the data in the buffer 618 of the memory 606. The processor 602 determines whether the input buffer 618 in the memory 606 is full. If the buffer 618 is full, the method proceeds to block 806. If the buffer is not full, the method proceeds to block 802 to receive more input data. In an embodiment, the input buffer is the buffer 336 shown in FIG. 3, which stores input samples until the buffer is full and then passes the buffer of input samples to the frequency shifter 312.

At block 806, stored parameters are retrieved from a memory. For example, the processor 602 retrieves the parameters 616 from the memory 606. The parameters 616 are used to perform frequency shifting and downsampling. In an embodiment, the parameters used for frequency shifting are the accumulated phase values 320. The parameters used form downsampling are the sample count 516, comb accumulator values 518, and the integrator accumulator values 520.

At block 808, the preamble data is frequency shifted using the parameters to generate frequency shifted data. For example, the processor 602 performs this process using one or more of the parameters 616. In an embodiment, the frequency shifter 312 performs this process using one or more parameters 320 of the database 304.

At block 810, the frequency shifted data is oversampled. For example, the processor 602 performs this process. In an embodiment, the oversampler 314 performs this process to generate oversampled data 324.

At block 812, the oversampled data is downsampled. For example, the processor 602 performs this downsampling process using the parameter database 616 as described above. In another embodiment, the downsampler 316 performs this process using the parameters 326 from the database 304.

At block 814, the parameters are updated and stored in the memory. For example, the processor 602 performs this process by storing the updated parameters in the database 616. In an embodiment, the frequency shifter 312 and the downsampler 316 store the updated parameters in the database 304.

At block 816, a determination is made as to whether there are enough downsampled data samples to detect a preamble. For example, the processor 602 makes this determination. If there are not enough samples, the method proceeds to block 804 to receive more input data. If there are enough samples, the method proceeds to block 818. In an embodiment, the buffer 336 outputs data to the frequency shifter 312 when enough samples are received.

At block 818, the downsampled data is correlated with signature sequences. For example, the processor 602 correlates the downsampled data with the signature sequences 612 to generate a correlated output. In an embodiment, the fast correlator 306 correlates the output of the downsampler 316 with the signature sequences 330 to generate the correlated output 332.

At block 820, peak detection is performed on the correlated data to detect the preamble associated with a particular UE. For example, the processor 602 performs peak detection on the correlated output to detect the preamble. In an embodiment, the peak detector 310 performs the peak detection on the correlator output 332 to detect the preamble 334.

Thus, the method 800 operates to detect preambles in a received uplink transmissions. It should be noted that the method 800 is exemplary and that the operations may be rearranged, added to, deleted, combined, or otherwise modified within the scope of the embodiments.

While particular embodiments of the present invention have been shown and described, it will be obvious to those skilled in the art that, based upon the teachings herein, changes and modifications may be made without departing from this exemplary embodiments of the present invention and its broader aspects. Therefore, the appended claims are intended to encompass within their scope all such changes and modifications as are within the true spirit and scope of these exemplary embodiments.

What is claimed is:

1. A method for preamble detection in a communication network, the method comprising:
    retrieving stored parameters from a parameter database;
    filling a buffer of preamble data received in an uplink transmission from user equipment;
    frequency shifting the buffer of preamble data based on one or more first parameters to generate frequency shifted data;
    oversampling the frequency shifted data to generate oversampled data;
    downsampling the oversampled data based on one or more second parameters to generate preamble samples;
    updating the parameter database with updated values for the one or more first and second parameters; and
    repeating operations until a selected amount of preamble samples is obtained.

2. The method of claim 1, further comprising:
    correlating the selected amount of preamble samples with a signature sequence to generate a correlated output; and
    performing peak detection on the correlated output to detect a transmitted preamble.

3. The method of claim 2, wherein the signature sequence comprises a matrix of preamble formats.

4. The method of claim 2, wherein the one or more first parameters comprise an accumulated phase value that is used in the operation of frequency shifting.

5. The method of claim 2, wherein the one or more second parameters comprise an input sample count that is used in the operation of downsampling.

6. The method of claim 2, wherein the one or more second parameters comprise filter states represented by accumulator values for all stages in a cascaded integrator comb (CIC) downsampler used in the operation of downsampling.

7. The method of claim 1, wherein the operation of frequency shifting selects a selected preamble signal at a desired frequency.

8. The method of claim 1, wherein the operation of oversampling comprises sample copying.

9. The method of claim 1, wherein the operation of downsampling comprises processing the oversampled data with a CIC downsampler.

10. Apparatus for preamble detection in a communication network, the apparatus comprising:
    a processor and a memory configured to perform operations of:
        retrieving stored parameters from a parameter database stored in the memory;
        filling a buffer of preamble data received in an uplink transmission from user equipment;
        frequency shifting the buffer of preamble data based on one or more first parameters to generate frequency shifted data;
        oversampling the frequency shifted data to generate oversampled data;
        downsampling the oversampled data based on one or more second parameters to generate preamble samples;
        updating the parameter database with updated values for the one or more first and second parameters; and
        repeating operations until a selected amount of preamble samples is obtained.

11. The apparatus of claim 10, further comprising:
    a correlator coupled to the processor and configured to generate a correlated output in response to the selected amount of preamble samples and a signature sequence; and
    a profiler peak detector coupled to the processor and configured to performing peak detection based on the correlated output for detecting a transmitted preamble.

12. The apparatus of claim 11, wherein the signature sequence comprises a matrix of preamble formats.

13. The apparatus of claim 10, wherein the one or more first parameters comprise an accumulated phase value that is used in the operation of frequency shifting.

14. The apparatus of claim 10, wherein the one or more second parameters comprise an input sample count that is used in the operation of downsampling.

15. The apparatus of claim 10, wherein the one or more second parameters comprise accumulator values for all stages in a cascade integrator comb (CIC) downsampler used in the operation of downsampling.

16. The apparatus of claim 10, wherein the operation of frequency shifting selects a selected preamble signal at a desired frequency.

17. The apparatus of claim 10, wherein the operation of oversampling comprises sample copying.

18. The apparatus of claim 10, wherein the operation of downsampling comprises processing the oversampled data with a CIC downsampler.

19. Apparatus for preamble detection in a communication network, the apparatus comprising:
    means for retrieving parameters from a parameter database;
    means for filling a buffer of preamble data received in an uplink transmission from user equipment;
    means for frequency shifting the buffer of preamble data based on one or more first parameters to generate frequency shifted data;
    means for oversampling the frequency shifted data to generate oversampled data;
    means for downsampling the over sampled data based on one or more second parameters to generate preamble samples;
    means for updating the parameter database with updated values for the one or more first and second parameters; and
    means for repeating operations until a selected amount of preamble samples is obtained.

20. The apparatus of claim 19, further comprising:
    correlating the selected amount of preamble samples with a signature sequence to generate a correlated output; and
    performing peak detection on the correlated output to detect a transmitted preamble.

* * * * *